US007394664B1

(12) United States Patent
Chang

(10) Patent No.: US 7,394,664 B1
(45) Date of Patent: Jul. 1, 2008

(54) FASTENING MECHANISM

(75) Inventor: Lin-Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/708,280

(22) Filed: Feb. 19, 2007

(51) Int. Cl.
*H05K 7/14* (2006.01)

(52) U.S. Cl. ....................... 361/801; 361/797; 361/798; 361/802; 439/337; 439/341

(58) Field of Classification Search ................. 361/609, 361/617, 680–683, 741, 756, 759, 796–802; 439/325, 328, 377, 337, 341–345
See application file for complete search history.

(56) References Cited

U.S. PATENT DOCUMENTS

| | | | | |
|---|---|---|---|---|
| 4,350,403 | A * | 9/1982 | Seytre et al. | 439/325 |
| 5,928,024 | A * | 7/1999 | Ming-Huang | 439/377 |
| 6,083,026 | A * | 7/2000 | Trout et al. | 439/328 |
| 6,246,585 | B1 * | 6/2001 | Gunther et al. | 361/759 |
| 6,881,089 | B1 * | 4/2005 | Yang | 439/377 |
| 6,943,999 | B2 * | 9/2005 | Gray et al. | 361/1 |
| 2002/0126441 | A1 * | 9/2002 | Kuo et al. | 361/680 |
| 2003/0053274 | A1 * | 3/2003 | Raabe et al. | 361/93.8 |
| 2006/0232947 | A1 * | 10/2006 | Chang | 361/740 |

* cited by examiner

*Primary Examiner*—Tuan Dinh
*Assistant Examiner*—Xiaoliang Chen
(74) *Attorney, Agent, or Firm*—Jianq Chyun IP Office

(57) ABSTRACT

The present invention discloses a fastening mechanism, by which an expansion card can be mounted in the housing of an electronic apparatus. The fastening mechanism includes: a base disposed in the housing; a retention member having one side thereof pivotally connected to one side of the base, and the side facing the rear of the housing is provided with a slot for an expansion card to insert therein; and a push handle disposed between the base and the retention member for allowing the retention member to be elastically pushed towards the expansion card to thereby hold the end portion of the expansion card in the slot of the retention member.

8 Claims, 5 Drawing Sheets

2
2021
202
213
211
30
3
212
20
201
21
214

FASTENING MECHANISM

BACKGROUND OF THE INVENTION

1. Field of the Invention

The present invention relates to fastening mechanisms, and, more particularly, to a fastening mechanism which facilitates mounting expansion cards in the housing of an electronic appliance.

2. Background of the Invention

To achieve certain functionalities, personal computers are usually connected with corresponding peripheral components. One mechanism for connecting a computer to a peripheral component is with the PCI (peripheral component interconnect) interface, which allows a computer's motherboard to be connected to one or more PCI cards. Expansion cards are implemented as peripherals of an apparatus such as a desktop computer and add functionality such as TV tuners, network interfaces, and so on.

In a typical computer system, a motherboard is integrated with PCI slots to enable users to insert different PCI cards into the computer as required. For this reason, the computer chassis typically includes multiple slot openings covered with clamps that hold the cards in place, wherein such clamps can be removed before and restored after plugging PCI cards into the slots. This has been the prevailing configuration for the chassis of a computer system for sometime.

Referring to FIG. 1, a PCI bracket 1 is shown that receives a plurality of expansion cards therein for connecting to a server unit (not shown). Expansion cards include common expansion cards having the standard length and also extended expansion cards 11 that have a longer length than the common ones. Because of the extra length, the end portion of an extended expansion card 11 may be easily damaged due to weight that causes inclination of the end portion after a long period of use. Also, the PCI bracket 1 is required to have extra length for accommodating such lengthened expansion cards in a server unit, thus requiring a slot 10 to be provided at the end portion of the PCI bracket 1 for correspondingly receiving the extended expansion card 11 therein. To prevent the extended expansion card 11 from accidentally sliding out of the slot 10, a coupling member 12 is pivotally connected to the end portion of the PCI bracket 1 to connect with an open end of the slot 10 in order to hold the extended expansion card 11 in the slot securely.

The coupling member 12 is, for example, a flange structure that couples to an open end of the slot 10 of the PCI bracket. However, this coupling means has been known to have the drawbacks of insufficient stability and reliability. For the convenience of removing an expansion card when necessary, the coupling member 12 is not strongly coupled, and therefore, vibration may detach the expansion card from the PCI bracket 1. Although the slot 10 accommodates the end portion of the extended expansion card 11, it lacks buffering elasticity and easily allows flexing of the end portion of an extended expansion card 11 in the slot and thus fails to provide stability. Further, the slot 10 is integrally formed with the PCI bracket 1, increasing production complexity and thus manufacturing costs as a result.

The stability of PCI cards in the housing, and hence their reliability, depends on their firm installation. Any failure in this respect will generally affect the operation of the computer. What is needed is a fastening mechanism that readily facilitates attachment and/or detachment of a PCI bracket in a computer while allowing the cards to be held in a secure way.

SUMMARY OF THE INVENTION

To eliminate the aforementioned drawbacks, a primary objective of the present invention is to provide a fastening mechanism by which the end portion of an expansion card can be mounted to a motherboard and within a computer chassis stably.

Another objective of the present invention is to provide a fastening mechanism that provides buffering elasticity to enhance the stability of an expansion card in the housing.

Another objective of the present invention is to provide a fastening mechanism that helps reduce the costs of manufacturing and installation.

In order to achieve the above and other objectives, the present invention provides a fastening mechanism by which an expansion card can be mounted to the housing of an electronic apparatus. The fastening mechanism includes: a base disposed in the housing; a retention member having one side thereof pivotally connected to one side of the base, and the side facing the rear of the housing being provided with a slot for an expansion card to insert therein; and a push handle disposed between the base and the retention member for allowing the retention member to be elastically pushed towards the expansion card to thereby hold the end portion of the expansion card in the slot of the retention member.

The expansion card being held may be one having an extended length, wherein the end portion thereof can be received and embedded into the slot of the retention member to avoid being stressed by heavy weight. Also, the expansion card can be installed in either a horizontal-type or vertical-type server or similar apparatus.

In the case that the fastening mechanism of the invention is applied to a horizontal-type server, the expansion card is first inserted into a PCI bracket for being electrically connected to the motherboard. Typically, a fan bracket is provided close to the motherboard to support a cooling fan in the housing, and the housing of the fastening mechanism of the present invention can be optionally used as a fan bracket.

When the fastening mechanism of the invention is applied to a vertical-type server unit, the fastening mechanism is installed on the motherboard by means of an intermediate board that is provided in the vertical-type server.

Compared to the prior technique in which a groove is provided at the end portion of a PCI bracket for being partially connected with a coupling member at an open end of the groove in order to hold the end portion thereof in the slot, the fastening mechanism of the invention is characterized by the use of an arm portion provided on the surface of a retention member and facing the back of the expansion card, and use of an elastic push portion having an elastic flange that extends from an end portion of the retention member, such that the elastic flange can abut against the end of the push piece to embed and secure the slot in the end portion of the expansion card. Therefore, even if the retention member of the expansion card is deliberately or inadvertently moved, the elastic flange of the retention member provides even stronger abutment against the end portion of the push piece and detachment of the slot from the end portion of the expansion card is prevented. Yet, the detachment of the flange from the push piece requires only a slight push on the retention member towards the end portion of the expansion card, providing easy disassembly while assuring firm installation and stability in the housing and hence the reliability of the expansion card.

Moreover, the elasticity of the elastic push portion enables the retention member to tightly abut against the end portion of the expansion card and the possibility of flexing in the slot is prevented.

In addition, the fastening mechanism of the invention can be installed in the housing of a fan bracket, thus the cost of manufacturing the PCI bracket, which is integrally formed with the slot in the prior technique, can be saved. And, the base, which pivotally connects with the retention member, and the push piece are both simple structures that can be easily made, and also the retention member can be separately made to help reduce the manufacturing cost as a result.

DETAILED DESCRIPTION OF THE PREFERRED EMBODIMENTS

Figure 1:
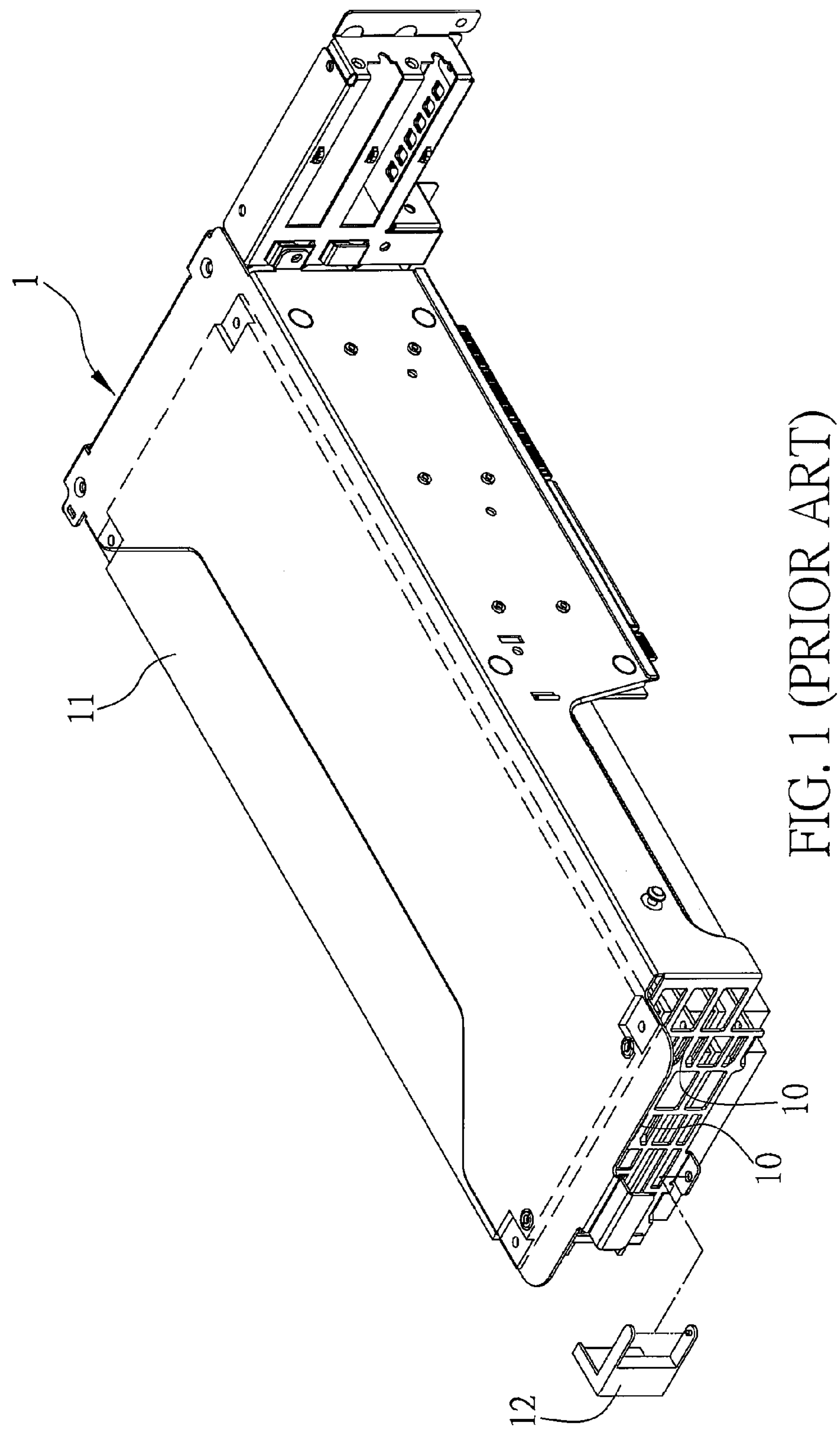
FIG. 1 (PRIOR ART) is a perspective view showing a known fastening mechanism integrally formed with a PCI bracket for fastening a PCI bracket in a mechanical housing.
Figure 2:
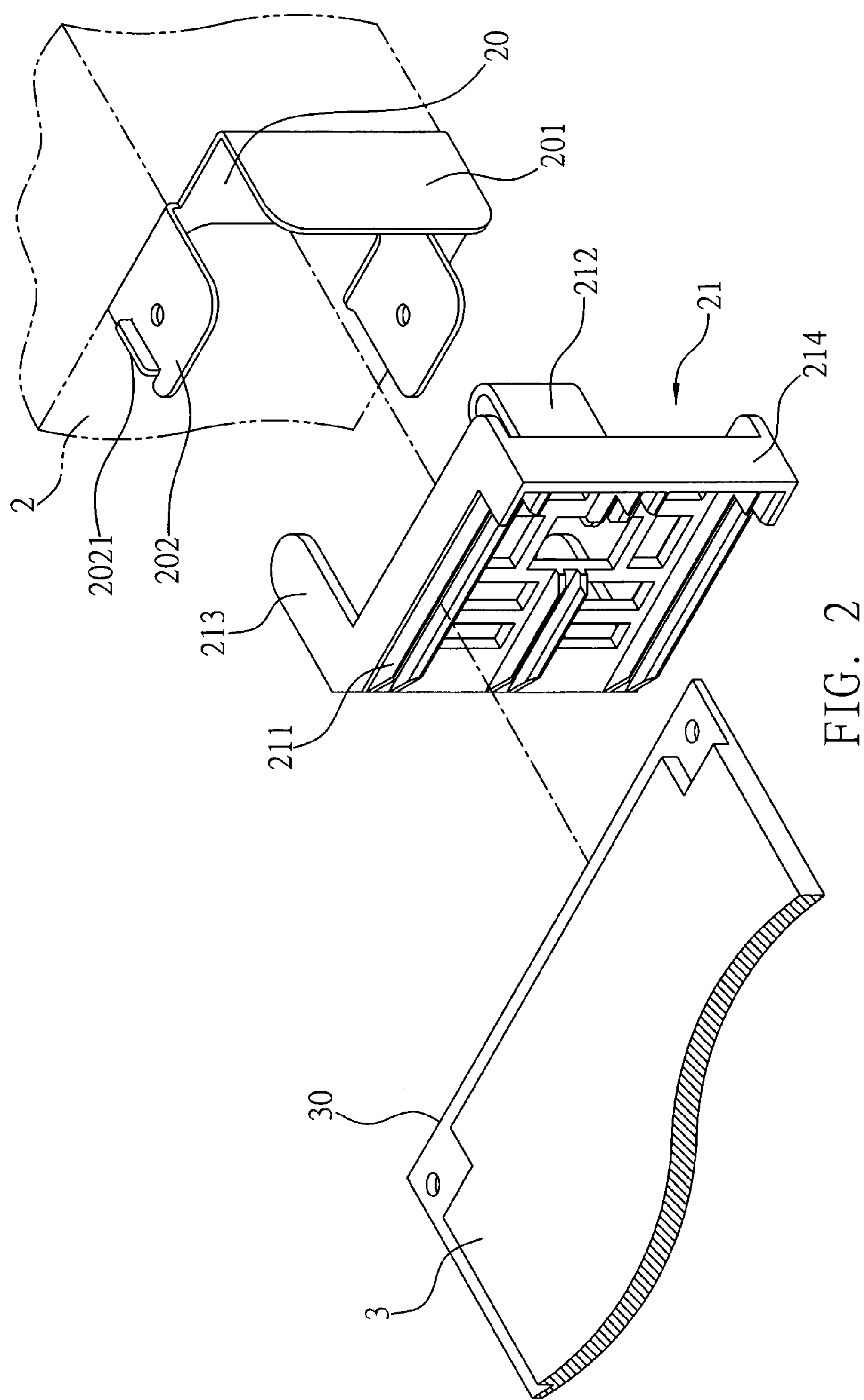
FIGS. 2 and 3 are perspective views showing preferred embodiments of the fastening mechanism in accordance with the present invention.
Figure 3:
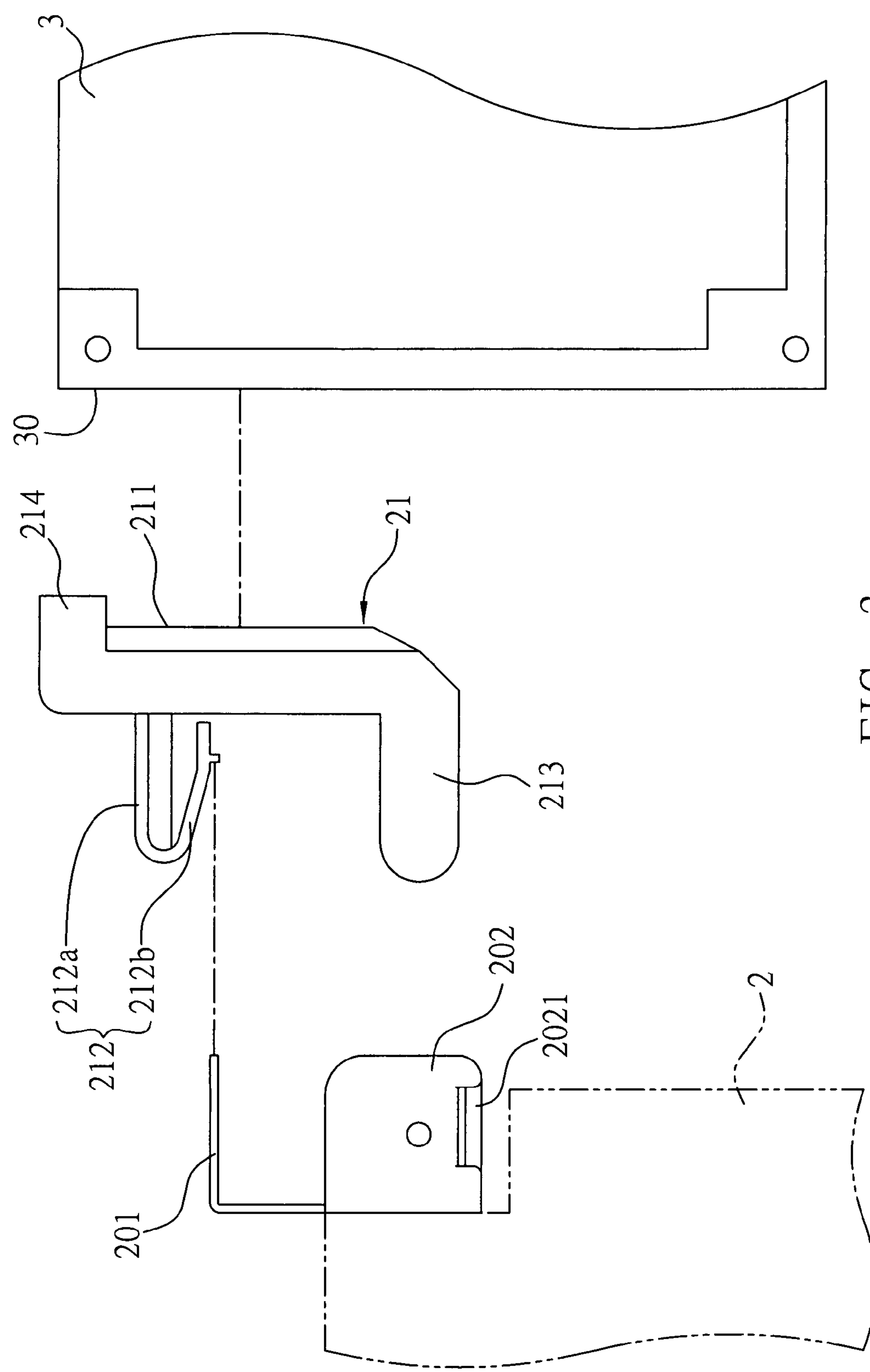

The fastening mechanism and method of installation are described with reference to a typical embodiment in a server computer, although the invention can be applied to any number of computing systems. As shown in FIGS. 2 and 3, the fastening mechanism of the invention is installed in a housing 2 of an electronic apparatus (not shown), by which an end portion 30 of an expansion card 3 that is electrically connected to the motherboard can be fixed to an electronic apparatus.

The fastening mechanism of the invention includes: a base 20 disposed in the housing 2; a retention member 21 having one side thereof pivotally connected to one side of the base 20, and the side facing the rear of the housing 2 being provided with a slot 211 for an expansion card 3 to be inserted therein; and a push handle disposed between the base 20 and retention member 21 for allowing the retention member 21 to be elastically pushed towards the expansion card 3 to thereby hold the end portion 30 of the expansion card 3 in the slot 211 of the retention member 21.

The expansion card 3 may be the type with an extended length, and the end portion 30 thereof can be received and embedded into the slot 211 of the retention member 21 without being stressed by heavy weight.

The expansion card 3 can be installed in either a horizontal-type or a vertical-type server or other apparatus. The housing 2 includes a fan bracket disposed adjacent to the motherboard, an intermediate board provided in a vertical type server, and a PCI bracket for mounting the fastening mechanism of the invention to an end portion of the PCI bracket.

The push handle includes a push piece 201 disposed on one side of the base 20 with the end portion facing the retention member 21. There is an elastic pressure-receiving portion 212 disposed on one side of the retention member 21 at a position opposite to the end of the push piece 201 for receiving the pushing force from the push piece 201.

The push piece 201 extends evenly with the retention member 21 from the base 20, and, after an upright bend, extends vertically towards the elastic pressure-receiving portion 212.

The elastic pressure-receiving portion 212 may comprise an arm portion 212*a* disposed to project from the retention member 21 and to face the back of the expansion card 3, and an elastic piece 212*b* extending from the arm portion 212*a* towards the retention member 21 and having an elastic flange formed on one end thereof, allowing the flange of the elastic piece 212*b* to abut against an end portion of the push piece 201 and secure the slot 211 with the end portion 30 of the expansion card 3.

In one embodiment, each of the two ends of one side of the retention member 21 can extend to respectively each have a pivoting piece 213 comprising a projecting arm corresponding to one another. Similarly, the base 20 may include a pair of corresponding pivoting piece 202 each formed with a hole to pivotally connect the retention member 21 on the base 20.

In addition, the pivoting piece 202 may comprise a stop protrusion 2021 to block the side of the pivoting piece 213 of the retention member 21 for limiting the pivotal movement of the retention member 21 in a horizontal direction to make it level with the end portion 30 of the expansion card 3, thereby allowing the slot 211 to be fixed to the end portion 30 of the expansion card 3 at the right angle.

Note that the connecting structures of the pivoting pieces 213, 202 can be freely disposed and can switch with one another and both may have apertures for allowing penetration therethrough, depending on the preferences and applications. In that there are a variety of connection methods well known in the art, no further description thereof is detailed herein for brevity and clarity.

In other embodiment, a covering protrusion 214 is disposed at a position away from the end pivotally connected with the base such that it faces the end portion 30 of the expansion card 3, and the slot 211 of the retention member 21 extends to the covering protrusion 214 to cover the end portion 30 of the expansion card 3, thereby increasing the strength of fixing the end portion 30 of the expansion card 3.

Figure 4:
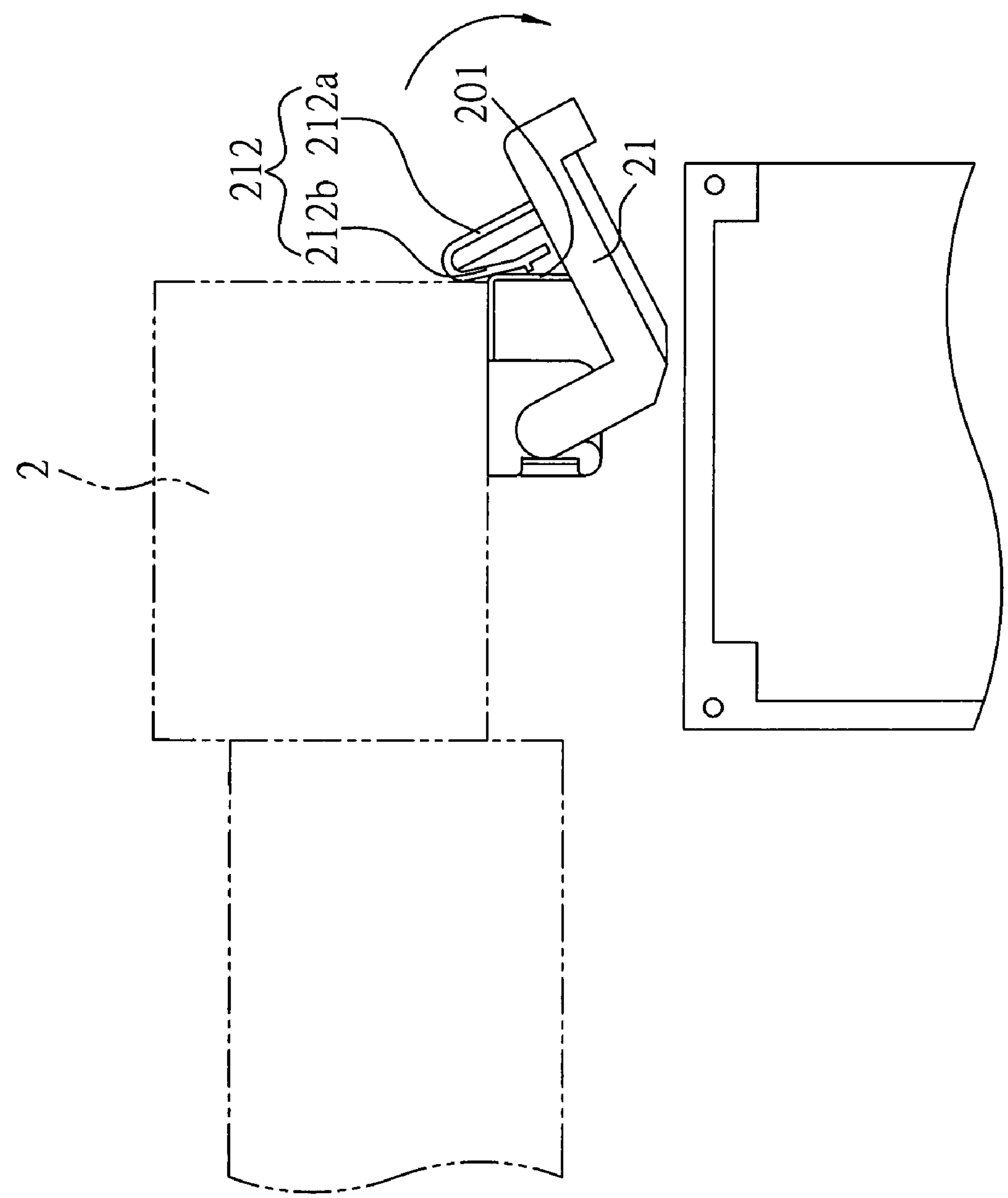
FIGS. 4 and 5 are perspective shows showing an embodiment of the fastening mechanism in action in accordance with the present invention.
Figure 5:
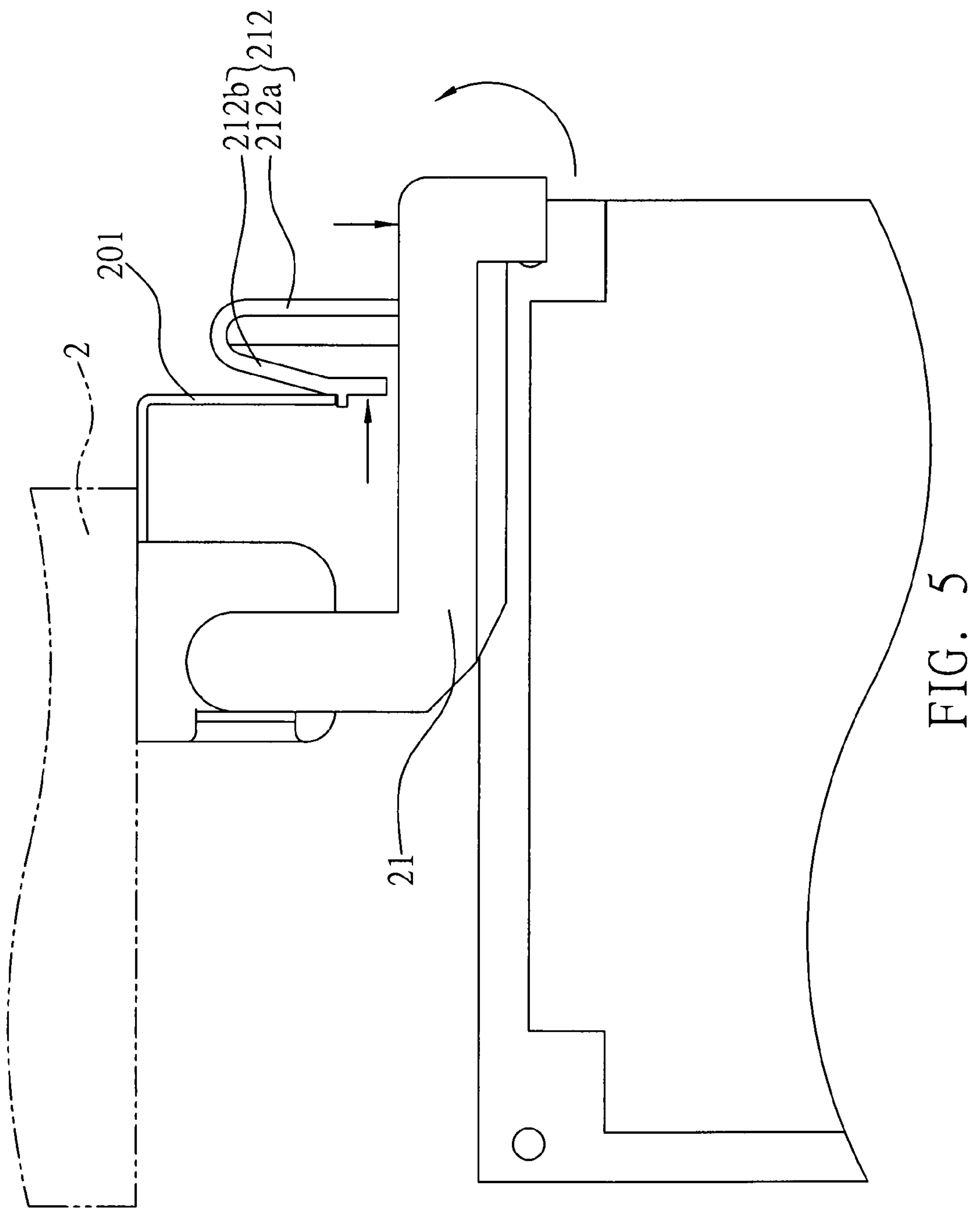

FIGS. 4 and 5 illustrate an embodiment of fixing the fastening mechanism of the invention to an end portion 30 of the expansion card 3. The retention member 21, which is posited at an angle free of interference with the electrical connection of the expansion card 3, is pivoted directly towards the end portion 30 of the expansion card 3 via the elastic pressure-receiving portion 212 so as to be pushed by the push piece 201, thereby fixing the slot 211 of the retention member 21 to the end portion 30 of the expansion card 3.

To disassemble the expansion card 3 from the fastening mechanism of the invention or to add more expansion cards, the user may slightly push the retention member 21 towards the end portion 30 of the expansion card 3 to loosen the flange of the elastic piece 212*b* of the push portion 212 from the push piece 201, and then pull the elastic piece 212*b* of the push portion 212 to detach the flange from the push piece 201, thereby turning the retention member 21 to allow the slot 211 of the retention member 21 to detach from the end portion 30 of the expansion card 3.

In comparison with the prior technique in which a groove is provided at the end portion of a PCI bracket for being partially connected with a coupling member at an open end of the groove to fix the end portion thereof in the slot, the fastening mechanism of the invention is characterized by the use of an arm portion provided on the surface of a retention member and facing the back of the expansion card, and an elastic push portion having an elastic flange that extends from an end portion of the retention member, such that the elastic flange can abut against the end of the push piece to embed the slot in the end portion of the expansion card. Therefore, even if the retention member of the expansion card is deliberately or accidentally moved, the elastic flange of the retention member tightens to abut against the end portion of the push piece, thus detachment of the slot from the end portion of the expansion card is prevented. Moreover, it requires only a slight push on the retention member towards the end portion of the expansion card in order to detach the flange from the push piece, thus assuring easy removal while providing firm installation in the housing and stability and hence the reliability of the expansion card.

Moreover, the elasticity of the elastic push portion enables the retention member to tightly abut against the end portion of the expansion card and the possibility of flexing in the slot is prevented.

In addition, the fastening mechanism of the invention can be installed in the housing of a fan bracket, thus the cost of manufacturing the PCI bracket, which is integrally formed with the slot in the prior technique, can be saved. And, the base, which pivotally connects with the retention member, and the push piece are both simple structures that can be easily made, and also the retention member can be separately made to help reduce the manufacturing cost as a result. Accordingly, the present invention offers advantages over the prior art and thus has high industrial applicability.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

What is claimed is:

1. A fastening mechanism, by which an expansion card is adapted to be attached to the housing of an electronic apparatus, comprising:

a base disposed in the housing;

a retention member having one side thereof pivotally connected to one side of the base, the side facing away from the housing being provided with a slot for an expansion card to insert therein;

a push handle disposed on one side of the base and having an end portion extending towards the retention member;

an elastic pressure-receiving portion disposed on one side of the retention member at a position opposite to the end portion of the push handle, wherein a terminal of the end portion is adapted to abutting against the elastic pressure-receiving portion for pushing the retention member towards the expansion card, such that the retention member holds the end portion of the expansion card in the slot of the retention member;

wherein the push handle is a push piece, and the elastic pressure-receiving portion is adapted to receiving the pushing force from the push piece; and wherein the pressure-receiving portion includes an arm portion disposed to project from the retention member, and an elastic piece extending from the arm portion towards the retention member and having an elastic flange formed on one end thereof to abut against an end portion of the push piece.

2. The fastening mechanism of claim 1, wherein the push piece extends parallel to the retention member from the base, and, after a right-angled bend, extends vertically towards the retention member.

3. The fastening mechanism of claim 1, wherein the elastic piece of the pressure-receiving portion is disposed at a position of the retention member away from the one side pivotally connected to the base, while the elastic flange of the elastic piece is disposed to face the side of the retention member pivotally connected to the base.

4. The fastening mechanism of claim 1, wherein each of the two ends of one side of the retention member can extend respectively to each have a pivoting piece comprising a projecting arm and corresponding to one another, and the base also includes a pair of corresponding pivoting pieces each formed with a hole to pivotally connect the retention member on the base.

5. The fastening mechanism of claim 4, wherein the pivoting piece comprises a stop protrusion to block the side of the pivoting piece of the retention member for limiting the pivotal movement of the retention member to make it parallel to the end portion of the expansion card, thereby allowing the slot to be coupled to the end portion of the expansion card at a right angle.

6. The fastening mechanism of claim 1, wherein each of the two ends of one side of the retention member can extend respectively to each have a pivoting piece comprising a hole and corresponding to one another, and the base also includes a pair of corresponding pivoting pieces each formed with a projecting arm to pivotally connect the retention member on the base.

7. The fastening mechanism of claim 6, wherein the pivoting piece comprises a stop protrusion to block the side of the pivoting piece of the retention member for limiting the pivotal movement of the retention member to make it parallel to the end portion of the expansion card, thereby allowing the slot to be coupled to the end portion of the expansion card at a right angle.

8. The fastening mechanism of claim 1, wherein a covering protrusion is disposed at a position away from the end pivotally connected with the base that faces the end portion of the expansion card, and the slot of the retention member extends to the covering protrusion to cover the end portion of the expansion card.

* * * * *